(12) United States Patent
Miyake

(10) Patent No.: US 11,343,442 B2
(45) Date of Patent: May 24, 2022

(54) IMAGE PROCESSING APPARATUS, IMAGE PROCESSING METHOD, AND RECORDING MEDIUM

(71) Applicant: CANON KABUSHIKI KAISHA, Tokyo (JP)

(72) Inventor: Toshihisa Miyake, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 101 days.

(21) Appl. No.: 16/849,157

(22) Filed: Apr. 15, 2020

(65) Prior Publication Data

US 2020/0344423 A1  Oct. 29, 2020

(30) Foreign Application Priority Data

Apr. 24, 2019 (JP) .............................. JP2019-083013

(51) Int. Cl.
*H04N 5/243* (2006.01)
*H04N 5/225* (2006.01)
*G06T 7/50* (2017.01)
*G06T 7/90* (2017.01)

(52) U.S. Cl.
CPC .............. *H04N 5/243* (2013.01); *G06T 7/50* (2017.01); *G06T 7/90* (2017.01); *H04N 5/22541* (2018.08)

(58) Field of Classification Search
CPC .... H04N 5/243; H04N 5/22541; H04N 9/045; H04N 5/361; H04N 9/735; G06T 7/50; G06T 7/90
See application file for complete search history.

(56) References Cited

U.S. PATENT DOCUMENTS

| | | | | |
|---|---|---|---|---|
| 4,680,624 A | * | 7/1987 | Murakami | H04N 9/07 348/251 |
| 5,820,472 A | * | 10/1998 | Briggs | A63B 9/00 472/128 |
| 2004/0012700 A1 | * | 1/2004 | Okisu | H04N 1/4072 348/333.01 |
| 2014/0204187 A1 | * | 7/2014 | Sasaki | G06T 7/33 348/65 |
| 2020/0204775 A1 | * | 6/2020 | Kitajima | H04N 9/735 |

FOREIGN PATENT DOCUMENTS

JP  2010-109670 A  5/2010

* cited by examiner

*Primary Examiner* — Hung H Lam
(74) *Attorney, Agent, or Firm* — Canon U.S.A., Inc. IP Division

(57) ABSTRACT

An image processing apparatus acquires color difference information from an output signal of a first area optically shielded from light on an image sensor, and determines, based on the color difference information, at least either of a first range in which an achromatic color area is extracted from an output signal of a second area where image capturing for an optical image is performed on the image sensor, and a second range in which white balance of the output signal of the second area is controlled.

10 Claims, 11 Drawing Sheets

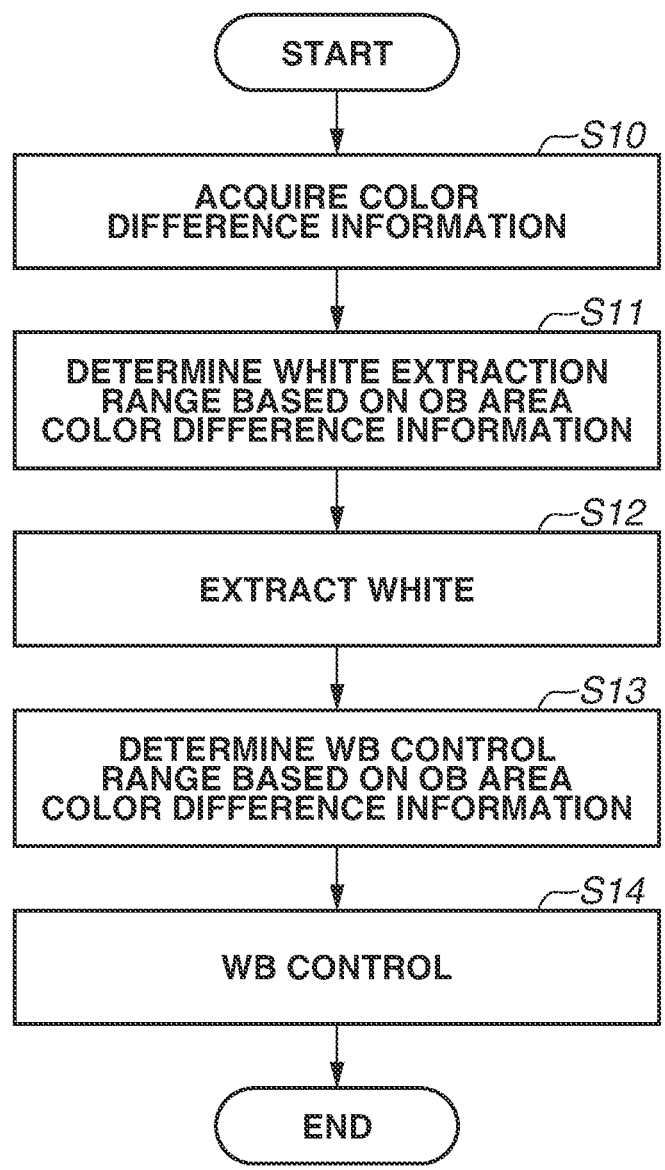

IMAGE PROCESSING APPARATUS, IMAGE PROCESSING METHOD, AND RECORDING MEDIUM

BACKGROUND

Field of the Disclosure

The present disclosure relates to, for example, an image processing technique for controlling white balance of an image.

Description of the Related Art

In a case where a level of input to an image sensor is low in a low-illuminance environment, for example, a method for obtaining an appropriate signal level by applying a large gain to a signal output from the image sensor to amplify the signal is often used. If, however, a large gain is applied, a noise component such as a dark current output from the image sensor may also be amplified, and noise of a color that does not originally exist may be output. In a case where a signal output from the image sensor is evaluated by an image processing apparatus, the image processing apparatus is not able to determine whether the signal does not include noise or includes noise. Consequently, the image processing apparatus may output an image influenced by noise.

Japanese Patent Application Laid-Open No. 2010-109670 discusses a technique for adjusting a white balance gain based on a signal output from an optical black (OB) area of an image sensor, to reduce color noise.

If, however, color noise is reduced by adjusting a white balance gain using the technique discussed in Japanese Patent Application Laid-Open No. 2010-109670, since the adjusted white balance gain is different from a normal white balance gain, appropriate white balance cannot be obtained. For example, if the color noise is unbalanced to some color, a white balance gain is applied to cancel out the unbalance. Consequently, the entire color deviates to a color different from normal color.

Further, since the image processing apparatus evaluates all signals output from the image sensor when controlling white balance, the image processing apparatus even evaluates signals including those of color noise. If signals including those of color noise are also evaluated, an area that should be normally extracted as an achromatic color area may be erroneously determined as a chromatic color.

SUMMARY

According to embodiments of the present disclosure, an image processing apparatus includes one or more processors, and at least one memory storing executable instructions, which when executed by the one or more processors, cause the image processing apparatus to perform operations includes acquiring color difference information from an output signal of a first area optically shielded from light on an image sensor, and determining, based on the color difference information, at least either of a first range in which an achromatic color area is extracted from an output signal of a second area where image capturing for an optical image is performed on the image sensor, and a second range in which white balance of the output signal of the second area is controlled.

Further features of the present disclosure will become apparent from the following description of exemplary embodiments with reference to the attached drawings.

BRIEF DESCRIPTION OF THE DRAWINGS

FIG. 2 is a flowchart illustrating processing by an image processing unit.

DESCRIPTION OF THE EMBODIMENTS

Figure 1A:
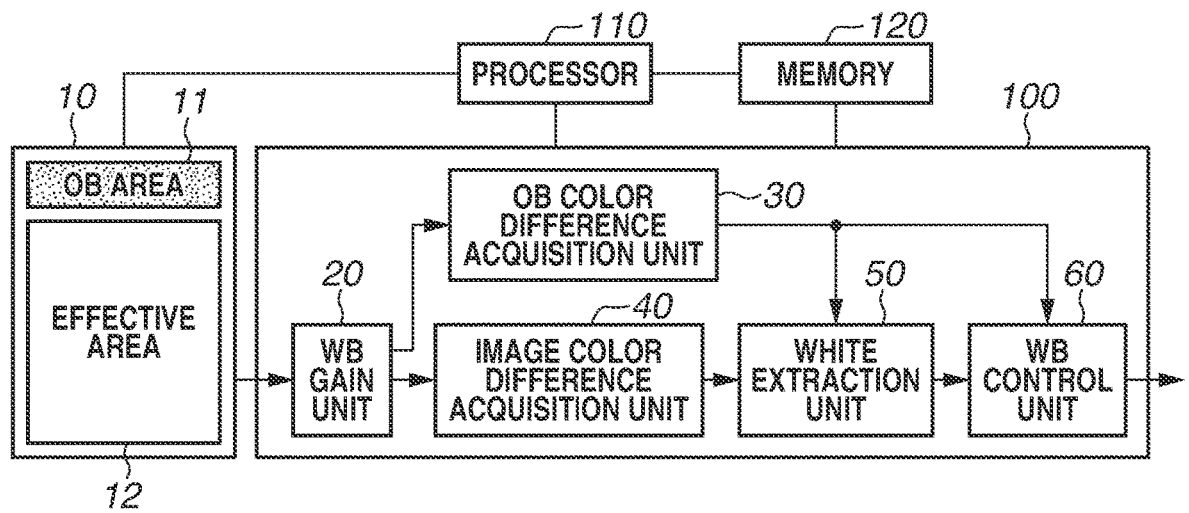
FIGS. 1A, 1B, and 1C are diagrams each illustrating an example of a configuration of an imaging apparatus.

FIG. 1A is a diagram illustrating a configuration example of an imaging apparatus according to a first exemplary embodiment, including an image processing unit 100, which is an example of application of an image processing apparatus according to the present disclosure, and an image sensor 10. Although not illustrated in FIG. 1A, the imaging apparatus according to the present exemplary embodiment also includes various components normally included in an imaging apparatus such as a digital camera or a digital video camera.

In the imaging apparatus according to the first exemplary embodiment, a processor 110 controls the functions of the image sensor 10 and the image processing unit 100. These functions may be achieved by the processor 110 executing a program saved in a memory 120 and controlling components, or may be achieved by a circuit configuration. Each component illustrated in FIG. 1A is not limited to a single piece of hardware. For example, a single piece of hardware may function as a plurality of units, or a plurality of pieces of hardware may cooperate to function as a single unit.

The memory 120 stores various programs, data, and a constant.

The image sensor 10 is an image sensor that captures an optical image of an object formed by an optical system (not illustrated) and outputs the optical image. The image sensor 10 includes an effective area 12 where a captured image can be acquired by capturing an optical image on the image sensor 10, and an optical black area (hereinafter, "OB area") 11 that is an area optically shielded from light on the image sensor 10. The image sensor 10 sends a signal of a captured image output from the effective area 12 and an output signal of the OB area 11 to the image processing unit 100. The image sensor 10 also includes color filters for three primary colors, namely red (R), green (G), and blue (B), similarly to a general image sensor. The output signals of the image sensor 10 are amplified by an amplification circuit (not illustrated), and the amplified signals are converted into digital signals by an analog-to-digital (AD) converter. The digital signals are sent to the image processing unit 100.

The image processing unit 100 includes a white balance (WB) gain unit 20, an OB color difference acquisition unit 30, an image color difference acquisition unit 40, a white extraction unit 50, and a WB control unit 60.

The WB gain unit 20 performs white balance gain processing for applying a white balance gain to the output signals of the image sensor 10. In the description of the present exemplary embodiment, white balance is referred to as "WB", where appropriate. In the present exemplary embodiment, the WB gain unit 20 applies a WB gain to each of the output signal of the OB area 11 of the image sensor 10 and the signal of the captured image output from the effective area 12 of the image sensor 10. In the present exemplary embodiment, the WB gain and a WB control range when the WB gain unit 20 applies the WB gain are determined by the WB control unit 60 as described below. The WB gain unit 20 outputs a signal obtained by applying the WB gain to the output signal of the OB area 1 to the OB color difference acquisition unit 30 and outputs a signal obtained by applying the WB gain to the signal of the captured image from the effective area 12 to the image color difference acquisition unit 40.

The OB color difference acquisition unit 30 acquires color difference information from the signal obtained by applying the WB gain to the output signal of the OB area 11. Hereinafter, the color difference information acquired by the OB color difference acquisition unit 30 will be referred to as "OB area color difference information". The OB color difference acquisition unit 30 outputs the OB area color difference information to the white extraction unit 50 and the WB control unit 60.

The image color difference acquisition unit 40 acquires color difference information from the signal obtained by applying the WB gain to the signal of the captured image of the effective area 12. Hereinafter, the color difference information acquired by the image color difference acquisition unit 40 will be referred to as "effective area color difference information". The image color difference acquisition unit 40 outputs the effective area color difference information and the signal of the captured image to the white extraction unit 50.

Based on the effective area color difference information and the OB area color difference information, the white extraction unit 50 extracts an area estimated as an achromatic color area in the captured image of the effective area 12 from the captured image input to the white extraction unit 50 via the image color difference acquisition unit 40. In this processing, based on the OB area color difference information, the white extraction unit 50 estimates and acquires the signal amount of color noise of the image sensor 10. Further, based on the acquired signal amount of color noise and the effective area color difference information, the white extraction unit 50 determines the range of color differences to be used to extract the achromatic color area in the captured image. Then, based on the range of color differences for extracting the achromatic color area, the white extraction unit 50 extracts the achromatic color area from the captured image of the effective area 12. In the present exemplary embodiment, the white extraction unit 50 determines the range of color differences for extracting a white area among achromatic color areas from white to black, and based on the determined range of color differences, extracts the white area from the captured image. Hereinafter, the range of color differences for extracting the white area will be referred to as a "white extraction range". The details of the process of estimating the signal amount of color noise, the process of determining the white extraction range, and the process of extracting the white area will be described below. Then, the white extraction unit 50 outputs, to the WB control unit 60, information indicating the white area extracted as described above and the signal of the captured image input to the white extraction unit 50 via the image color difference acquisition unit 40.

The WB control unit 60 refers to the OB area color difference information sent from the OB color difference acquisition unit 30 and determines a WB gain and a WB control range by which the white area extracted by the white extraction unit 50 becomes white. The details of the WB control range will be described below. Then, the WB control unit 60 controls the WB gain unit 20 to perform WB gain processing based on the determined WB gain and WB control range. Consequently, the WB gain unit 20 performs the WB gain processing based on the WB gain and the WB control range determined by the WB control unit 60, and the WB gain unit 20 outputs a signal of a captured image having appropriate WB. Further, the WB control unit 60 outputs, to a circuit (not illustrated) at the subsequent stage, the signal of the captured image input to the WB control unit 60 via the white extraction unit 50.

FIG. 2 is a flowchart illustrating the flow of processing in which, as described above, the image processing unit 100 according to the present exemplary embodiment acquires color difference information, estimates a signal amount of color noise, determines a white extraction range and a WB control range, and performs WB gain processing.

In step S10, the OB color difference acquisition unit 30 of the image processing unit 100 acquires color difference information from an output signal of the OB area 11 of the image sensor 10. Further, in step S10, the image color difference acquisition unit 40 acquires color difference information from a signal of a captured image of the effective area 12.

In step S11, based on the OB area color difference information, as described below, the white extraction unit 50 determines a white extraction range that is the range of color differences to be used to extract a white area as an achromatic color area.

In step S12, based on the white extraction range determined in step S11, the white extraction unit 50 extracts the white area from the captured image of the effective area 12.

In step S13, based on the OB area color difference information acquired by the OB color difference acquisition unit 30, the WB control unit 60 determines the upper limit and the lower limit of a WB gain and determines a WB control range as described below.

In step S14, the WB control unit 60 controls the WB gain by which the white area obtained in step S12 becomes appropriate white in the WB control range determined in step S13.

Figure 3:
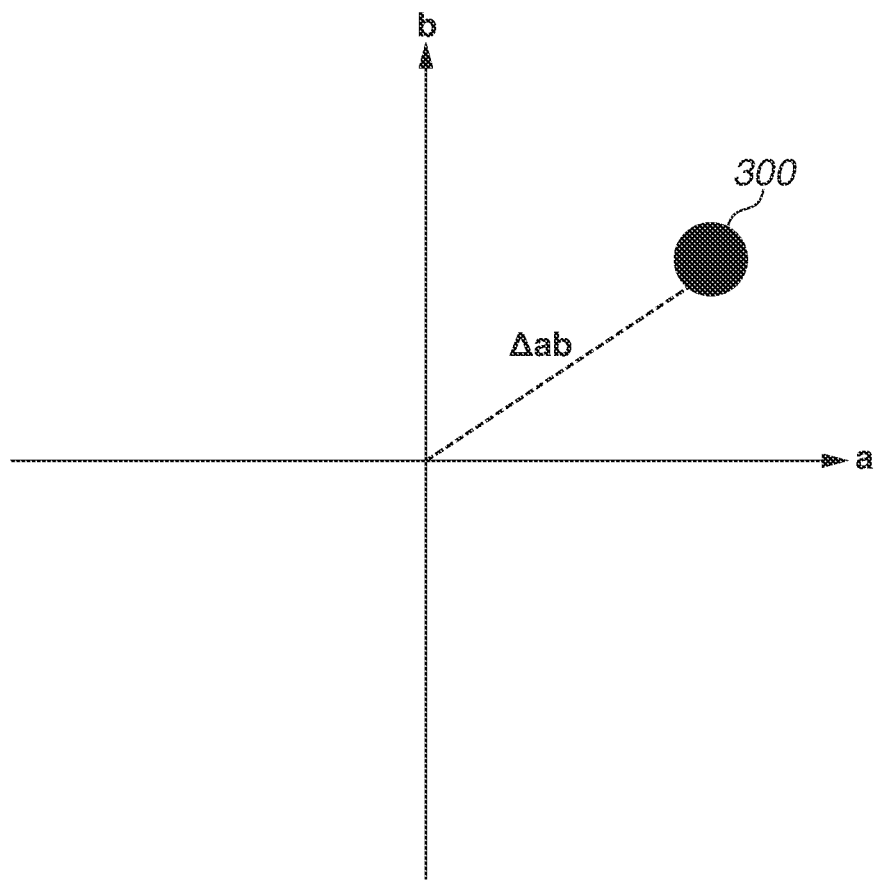
FIG. 3 is a diagram illustrating an example of a color difference occurring in an optical black (OB) area.

FIG. 3 is a diagram illustrating the color difference in the OB area 11 acquired in step S10 in FIG. 2 by the OB color difference acquisition unit 30 of the image processing unit 100 in FIG. 1A. FIG. 3 is a diagram representing a color difference ($\Delta ab$) in the so-called L*a*b* space and illustrating an example of a color difference 300 obtained from the signal of the OB area 11. Since the OB area 11 is an area shielded from light, the OB area 11 is completely black, and a color difference should not exist in the OB area 11. In the example of FIG. 3, however, the color difference 300 occurs due to the color noise of the image sensor 10.

Figure 4:
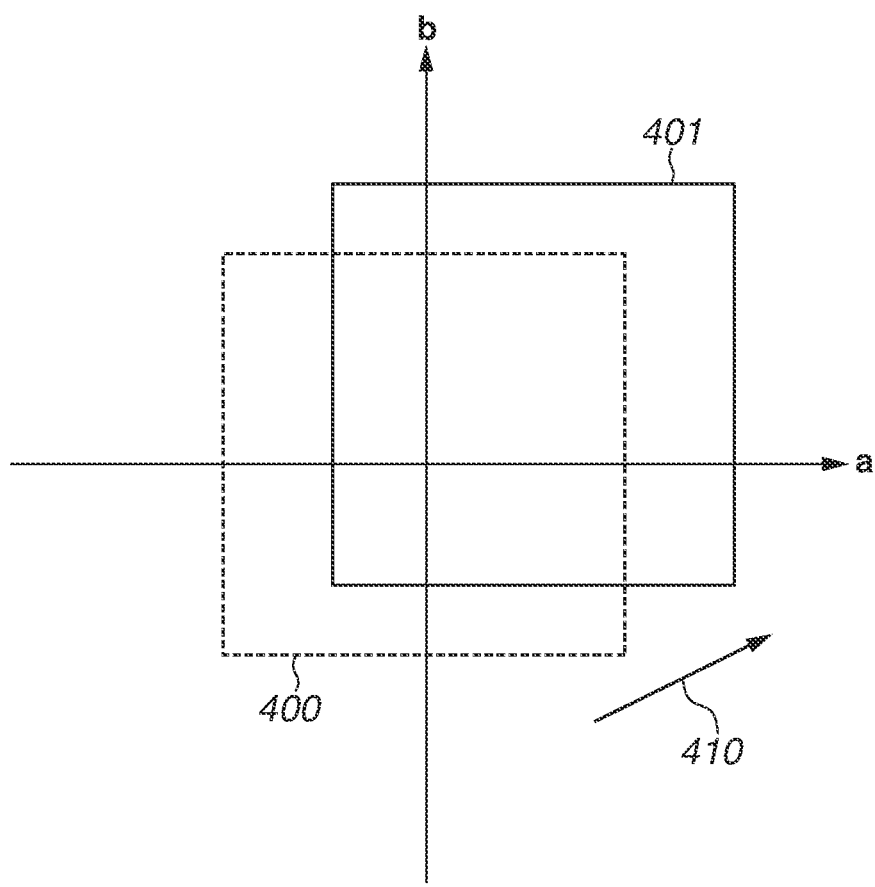
FIG. 4 is a diagram illustrating an example of a change in a white extraction area in a first exemplary embodiment.

FIG. 4 is a diagram illustrating an example of the determination of the white extraction range when the white extraction unit 50 in FIG. 1A extracts the white area in step S11 in FIG. 2 in a case where the color difference 300 occurs in the OB area 11 as illustrated in FIG. 3. Similarly to FIG. 3, FIG. 4 is a diagram representing a color difference in the L*a*b* space. In this case, as the white extraction range when the white area is extracted, a certain range centered on white of an achromatic color area is set. In the example of FIG. 4, a white extraction area 400 indicated by a dotted rectangle represents a white extraction area set in a certain range centered on white of an achromatic color area. However, for example, in a case where a color difference caused by the color noise of the image sensor 10 occurs, and if a white extraction area is the white extraction area 400 in a certain range centered on white of an achromatic color area, an area that is normally determined as an achromatic color area in the captured image may be erroneously determined as a chromatic color. In this case, when WB gain processing is performed on the signal of the captured image of the effective area 12, the color greatly changes.

Thus, in the present exemplary embodiment, the white extraction area is changed (moved) in the direction of the color difference caused by the color noise of the image sensor 10. In the present exemplary embodiment, based on color difference information on the OB area 11, the color noise of the image sensor 10 is estimated, and based on the estimated color noise, the white extraction area is changed. For example, in a case where the color difference 300 occurs in the OB area 11 due to color noise as illustrated in FIG. 3, the white extraction unit 50 determines a white extraction area 401 that has been moved in a direction indicated by an arrow 410 in FIG. 4 correspondingly to the direction of the color difference 300 caused by the color noise. More specifically, the white extraction unit 50 determines the white extraction area 401 by correspondingly moving the white extraction area 400, set in a certain range centered on white of an achromatic color area, to the direction of the color difference 300 caused by the color noise, to adjust the white extraction area 400. Consequently, even if color noise occurs in the image sensor 10, the white extraction unit 50 can extract an area of an achromatic color as a white area without erroneously extracting an area of a chromatic color as a white area.

Figure 5:
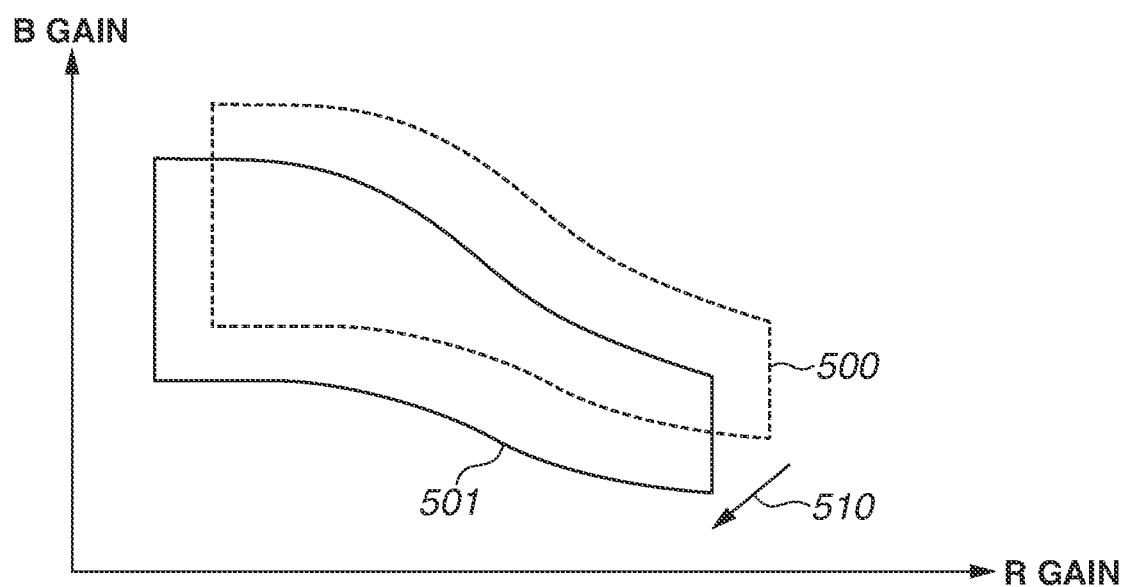
FIG. 5 is a diagram illustrating an example of a change in a white balance (WB) control range.

FIG. 5 is a diagram illustrating an example of the WB control range determined in step S13 in FIG. 2 by the WB control unit 60 in FIG. 1A in a case where the color difference 300 occurs in the OB area 11 due to color noise as illustrated in FIG. 3. The example of FIG. 5 represents a WB control range in a case where, as WB gain processing, the process of applying a gain to, for example, R and B signals among signals of the three RGB primary colors is performed. A WB control range is basically set to the range where chromatic colors are not brought into achromatic colors by WB gain processing. In the example of FIG. 5, a range 500 surrounded by a dotted line represents a WB control range that is generally set. If color noise is occurring in the image sensor 10, and the signal of the captured image includes the color noise, a WB gain is controlled in the direction of eliminating the color noise. If, however, a WB control range is a fixed range as in the range 500 illustrated in FIG. 5, for example, a WB gain may be unable to be sufficiently controlled in an end portion of the WB control range.

Thus, in the present exemplary embodiment, the WB control range is changed (moved) based on the color noise of the image sensor 10, i.e., color noise estimated from color difference information on the OB area 11. For example, in a case where the color difference 300 occurs in the OB area 11 due to color noise as illustrated in FIG. 3, the WB control unit 60 determines a WB control range 501 changed in a direction indicated by an arrow 510 in FIG. 5 by correspondingly to the direction of the color difference 300 caused by the color noise. More specifically, the WB control unit 60 determines the WB control range 501 by correspondingly moving the fixed WB control range 500 illustrated in FIG. 5 to the direction of the color difference 300 caused by the color noise, to adjust the fixed WB control range 500. Consequently, even if color noise occurs in the image sensor 10, the WB control unit 60 can control a WB gain so that the WB gain unit 20 can obtain appropriate WB.

In the present exemplary embodiment, an example has been described where the white extraction area and the WB control range are changed based on the color noise estimated from the color difference information on the OB area 11. Alternatively, only one of the white extraction area and the WB control range may be changed. More specifically, the image processing unit 100 performs at least either of the process of determining a white extraction range by moving and adjusting a certain range centered on white of an achromatic color area, and the process of determining a WB control range by moving and adjusting a fixed WB control range set in advance.

As described above, the image processing unit 100 according to the present exemplary embodiment acquires a color difference from an output signal of the OB area 11 of the image sensor 10 and estimates the signal amount of color noise of the image sensor 10 from the acquired color difference. Based on the estimated signal amount of color noise, the image processing unit 100 determines the extraction range of an achromatic color area (a white area) and a WB control range. Consequently, according to the present exemplary embodiment, it is possible to acquire an image having appropriate WB.

Figure 6:
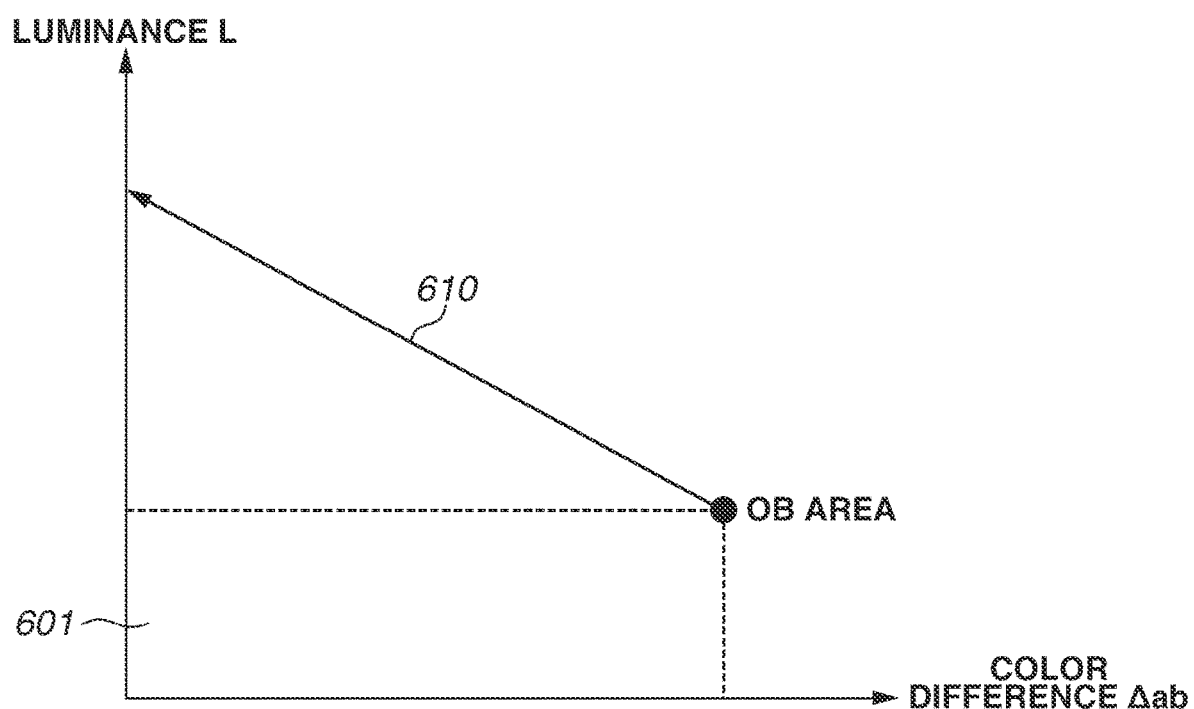
FIG. 6 is a diagram illustrating a relationship between luminance and color noise.
Figure 7:
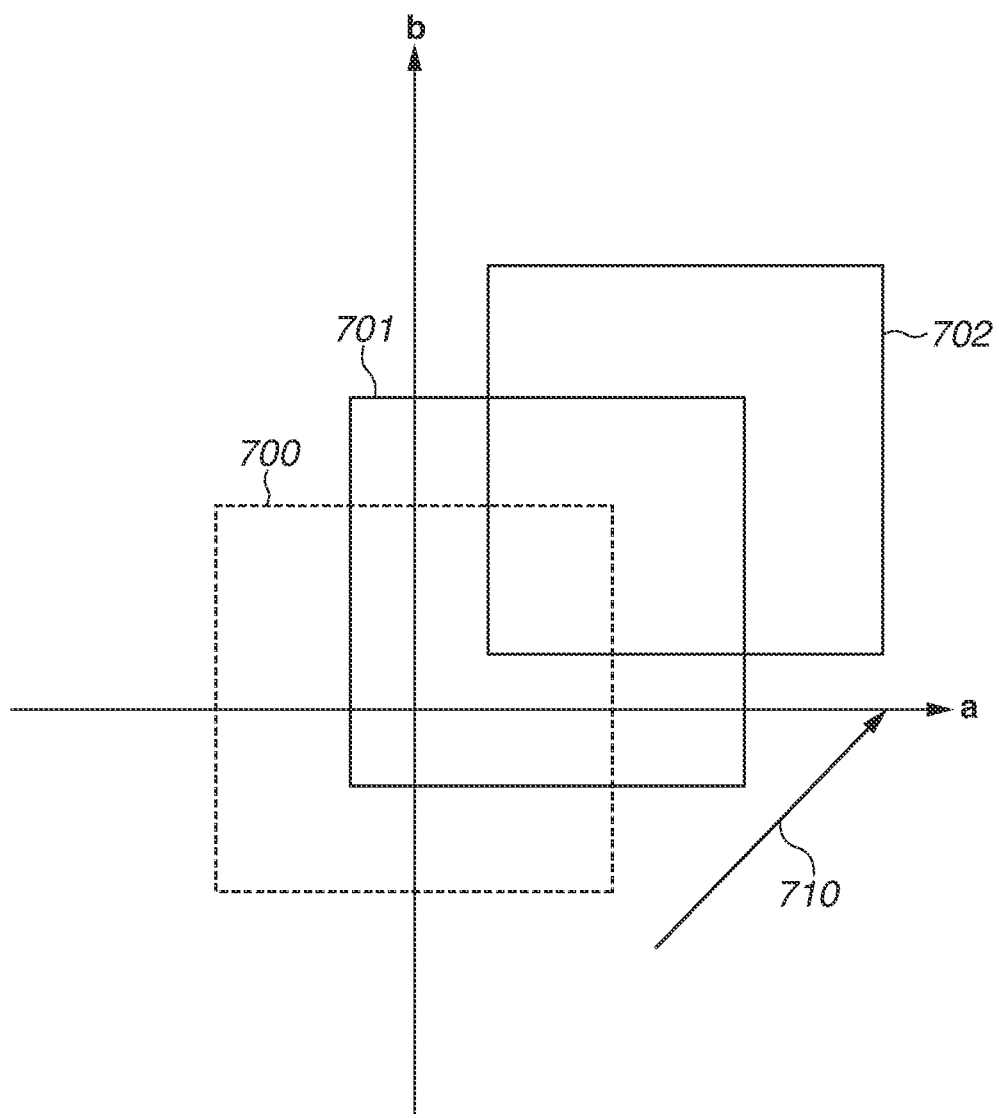
FIG. 7 is a diagram illustrating an example of a change in a white extraction area in conjunction with luminance.

With reference to FIGS. 6 and 7, an image processing apparatus according to a second exemplary embodiment of the present disclosure is described below. The configuration of the image processing apparatus according to the second exemplary embodiment is similar to that of the image processing unit 100 of the imaging apparatus illustrated in FIG. 1A, and therefore is not illustrated or described. In the image processing unit 100 according to the second exemplary embodiment, the processing procedure in which the signal amount of color noise is estimated from color difference information on the OB area 11, a white extraction range and a WB control range are determined, and WB gain processing is performed is basically similar to that in the flowchart in FIG. 2, and therefore the redundant description thereof is omitted.

In addition to the acquisition of color difference information from a signal of the OB area 11, the image processing unit 100 according to the second exemplary embodiment also acquires luminance information from a signal of the effective area 12 in a captured image, estimates the signal amount of color noise with the luminance information also taken into consideration, and determines a white extraction range and a WB control range. WB gain processing is similar to that in the first exemplary embodiment, and therefore the redundant description thereof is omitted.

FIG. 6 is a diagram illustrating the relationship between the level of luminance L in a captured image of the image sensor 10 and the level of a color difference Δab in the color noise of the image sensor 10. In FIG. 6, a rectangular portion 601 indicated by a dotted line represents the relationship between the levels of the luminance L and the color difference Δab in the color noise of the image sensor 10. Similarly to the first exemplary embodiment, the color noise can be estimated from color difference information on the OB area 11. There is a relationship between the luminance L and the color noise. As illustrated in FIG. 6, in a dark area such as the OB area 11, there is a tendency that a great amount of color noise occurs. Meanwhile, as indicated by a straight line 610, in the effective area 12, there is a tendency that the amount of color noise decreases with increasing the luminance L. More specifically, in a dark area, the influence of the color noise is relatively great. Meanwhile, the influence of the color noise decreases relatively with increasing the luminance L. In the second exemplary embodiment, information indicating the relationship between color noise that occurs with respect to each level of the luminance L and the level of the color difference Δab in the OB area 11 is stored as a correlation table.

Then, when determining a white extraction range, the white extraction unit 50 acquires luminance from a signal of a captured image obtained via the image color difference acquisition unit 40 and refers to the correlation table based on the acquired luminance and color difference information on the OB area 11, to acquire the signal amount of color noise according to the level of the luminance L. Then, Based on the signal amount of color noise according to the level of the luminance L, the white extraction unit 50 adjusts the amount of change for changing a color extraction range. For example, the higher the level of the luminance L, the signal amount of color noise becomes relatively smaller. Thus, the white extraction unit 50 sets the amount of change for changing the white extraction range to be relatively smaller with higher the level of the luminance L. Conversely, the lower the level of the luminance L, the signal amount of color noise becomes relatively greater. Thus, the white extraction unit 50 sets the amount of change for changing the white extraction range to be relatively greater with lower the level of the luminance L. More specifically, the white extraction unit 50 adjusts the amount of change in the color extraction range to be set closer to the amount of change according to the color difference information on the OB area 11, as described in the first exemplary embodiment, with lower the level of the luminance L. Conversely, the white extraction unit 50 adjusts the amount of change in the color extraction range to be further reduced from the amount of change according to the color difference information on the OB area 11, with higher the level of the luminance L.

FIG. 7 is a diagram illustrating the state where a white extraction range is changed in conjunction with luminance in the second exemplary embodiment. FIG. 7 is a diagram represented similarly to FIG. 4. A white extraction area 700 indicated by a dotted rectangle in FIG. 7 represents an area set in a certain range centered on white of an achromatic color area. An arrow 710 in FIG. 7 indicates the direction of a change in the white extraction range. In FIG. 7, two white extraction areas 701 and 702 are indicated by solid rectangles. The white extraction area 701 represents a case where the level of the luminance L is high, and the white extraction area 702 represents a case where the level of the luminance L is low. More specifically, in a case where the level of the luminance L is low, the signal amount of color noise is relatively great. Thus, the white extraction area 702 in a case where the level of the luminance L is low changes by a relatively greater amount from the white extraction area 700 indicated by a dotted rectangle than the white extraction area 701 in a case where the level of the luminance L is high. Meanwhile, in a case where the level of the luminance L is high, the signal amount of color noise is relatively small. Thus, the white extraction area 701 in a case where the level of the luminance L is high changes by a relatively smaller amount from the white extraction area 700 indicated by a dotted rectangle than the white extraction area 702 in a case where the level of the luminance L is low.

The above description has been given taking as an example the process of determining a white extraction area. In the present exemplary embodiment, the level of the luminance L is taken into account similarly to the above also when a WB control range is determined by the WB control unit 60. The WB control unit 60 may receive information on luminance from the white extraction unit 50, or may acquire luminance from a signal of a captured image. A correlation table representing the relationship between the level of luminance and the level of color noise similar to the above can be used also when the WB control range is determined.

That is, when determining a WB control range, based on the level of the luminance L and color difference information on the OB area 11, the WB control unit 60 acquires the signal amount of color noise according to the level of the luminance L, and based on the acquired signal amount of color noise, adjusts the amount of change for changing the WB control range. For example, the higher the level of the luminance L, the signal amount of color noise becomes relatively smaller. Thus, the WB control unit 60 sets the amount of change for changing the WB control range so that the higher the level of the luminance L, the amount of change for changing the WB control range is set relatively smaller. Meanwhile, the lower the level of the luminance L, the signal amount of color noise becomes relatively greater. Thus, the WB control unit 60 sets the amount of change for changing the WB control range so that the lower the level of the luminance L, the amount of change for changing the WB control range is set relatively greater. More specifically, the WB control unit 60 adjusts the amount of change in the WB control range to be set closer to the amount of change according to the color difference information on the OB area 11, as described in the first exemplary embodiment, with lower the level of the luminance L, the amount of change in the WB control range. Conversely, the WB control unit 60 adjusts the amount of change in the WB control range to be further reduced from the amount of change according to the color difference information on the OB area 11, with higher the level of the luminance L.

Also in the second exemplary embodiment, similarly to the first exemplary embodiment, the image processing unit 100 may change only either one of the white extraction area and the WB control range.

As described above, in the second exemplary embodiment, the image processing unit 100 estimates the signal amount of color noise with luminance information on the captured image of the effective area 12 taken into consideration, in addition to the color difference information on the OB area 11 of the image sensor 10, and determines a white extraction range and a WB control range. According to the second exemplary embodiment, a white extraction area and a WB control range are determined according to the level of the luminance L, and accordingly more appropriate WB control can be performed in comparison with the case according to the first exemplary embodiment.

Figure 1B:
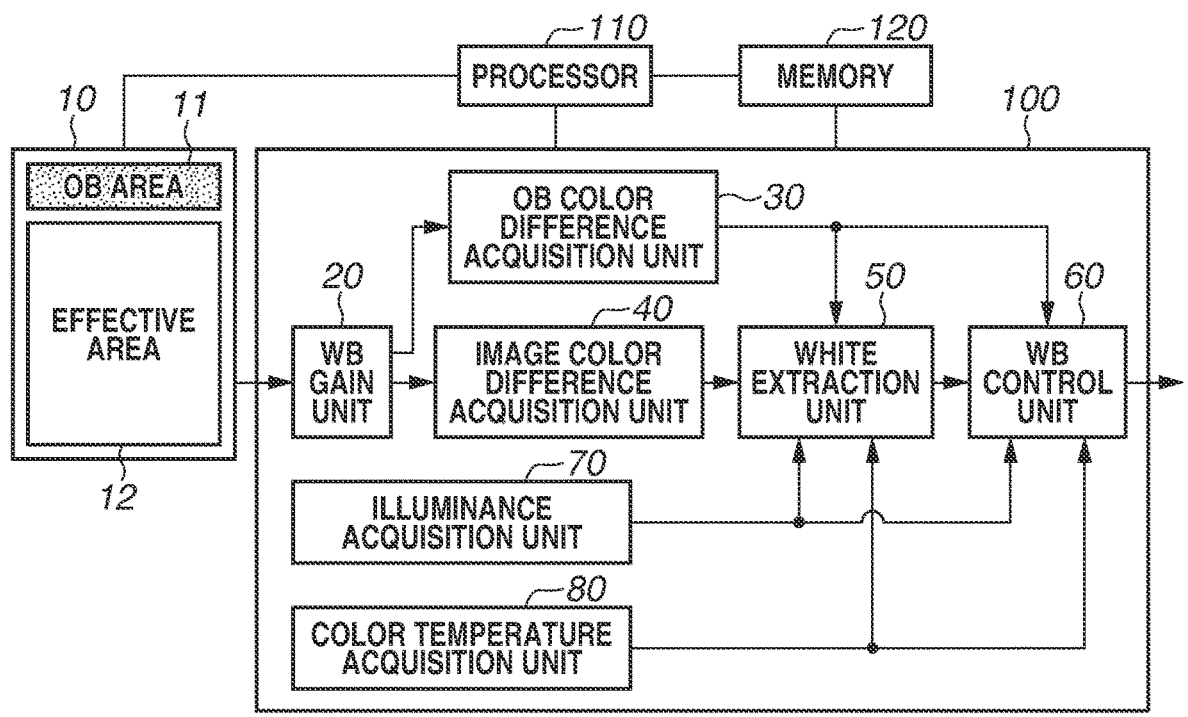
Figure 1C:
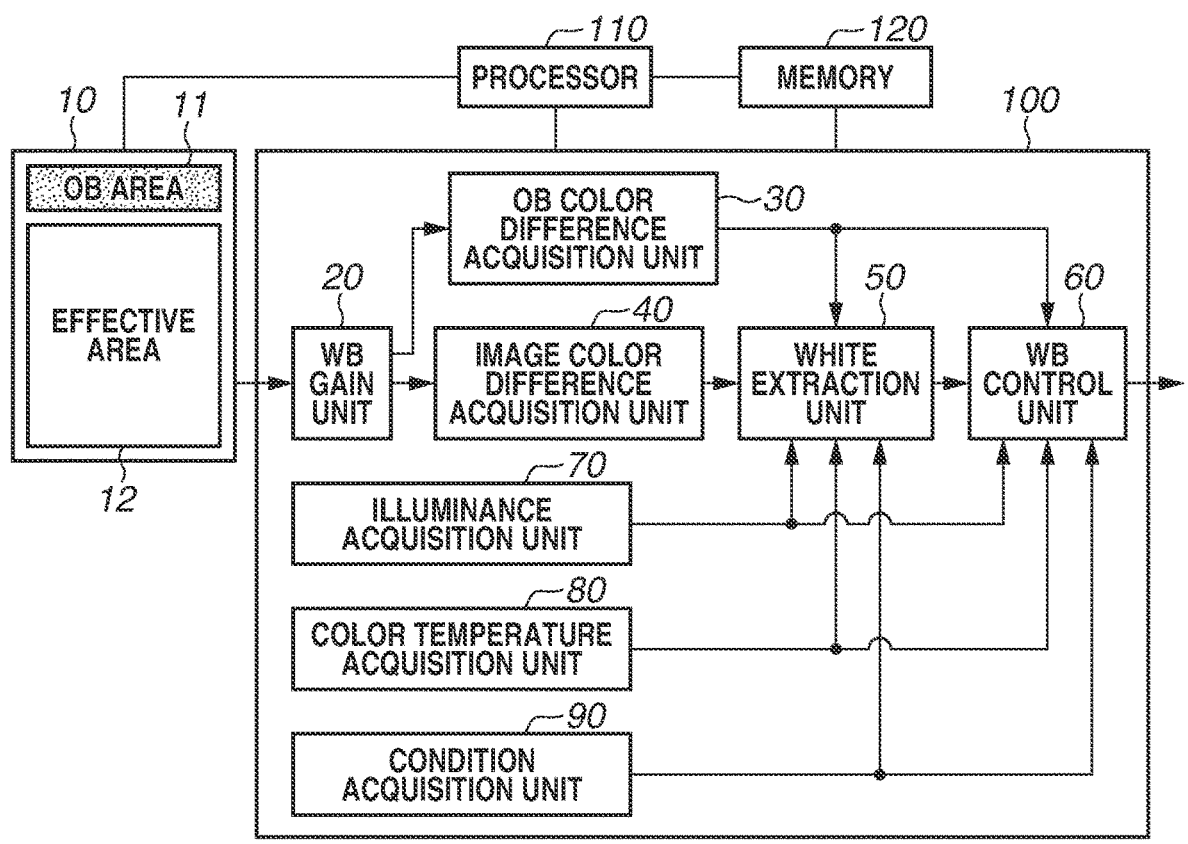

With reference to FIG. 1B, an image processing apparatus according to a third exemplary embodiment of the present disclosure is described below. In the third exemplary embodiment, among components in FIG. 1B, components similar to those in FIG. 1A are designated by the same reference signs, and the redundant description thereof is omitted.

In addition to the components in the above exemplary embodiments, the image processing unit 100 according to the third exemplary embodiment includes at least one of an illuminance acquisition unit 70 and a color temperature acquisition unit 80.

The illuminance acquisition unit 70 acquires the illuminance of the imaging environment of the imaging apparatus according to the present exemplary embodiment. The illuminance acquisition unit 70 may acquire illuminance detected by an illuminance sensor included in the imaging apparatus, or may measure and acquire illuminance based on an output signal of the effective area 12 of the image sensor 10. Then, the illuminance acquisition unit 70 outputs information on the acquired illuminance to the white extraction unit 50 and the WB control unit 60.

The color temperature acquisition unit 80 acquires the color temperature of a light source in the imaging environment of the imaging apparatus according to the present exemplary embodiment. The color temperature acquisition unit 80 may acquire color temperature from an output signal of the effective area 12 of the image sensor 10, or for example, may acquire information on color temperature according to a light source selected by a user from a light source selection menu prepared for the imaging apparatus. Then, the color temperature acquisition unit 80 outputs information on the acquired color temperature to the white extraction unit 50 and the WB control unit 60.

The acquisition of the illuminance and the acquisition of the color temperature of the light source may be performed by, for example, the white extraction unit 50.

If the information on the illuminance is input to the white extraction unit 50 according to the third exemplary embodiment, the white extraction unit 50 determines a white extraction area also using the information on the illuminance. Based on the information on the illuminance, the white extraction unit 50 according to the third exemplary embodiment determines whether the illuminance of the imaging environment is greater than or equal to predetermined illuminance sufficient to obtain appropriate exposure and appropriate white balance. Then, if the illuminance of the imaging environment is illuminance sufficient to obtain appropriate exposure and appropriate white balance, the white extraction unit 50 determines, as the white extraction area, an area set in a certain range centered on white of an achromatic color area as described above. Meanwhile, if the illuminance is less than the predetermined illuminance sufficient to obtain appropriate exposure and appropriate white balance, the white extraction unit 50 determines the white extraction area based on, for example, the OB area color difference information and the effective area color difference information as described in the above exemplary embodiment.

If the information on the illuminance is input to the WB control unit 60 according to the third exemplary embodiment, the WB control unit 60 determines a WB control range also using the information on the illuminance. Based on the information on the illuminance, the WB control unit 60 according to the third exemplary embodiment determines whether the illuminance of the imaging environment is illuminance sufficient to obtain appropriate exposure and appropriate white balance. If the illuminance of the imaging environment is illuminance sufficient to obtain appropriate exposure and appropriate white balance, the WB control unit 60 determines, as the WB control range, a fixed range set in advance as described above. Meanwhile, if the illuminance is not illuminance sufficient to obtain appropriate exposure and appropriate white balance, the WB control unit 60 determines the WB control range based on the OB area color difference information and the effective area color difference information, as described in the above exemplary embodiment.

In the third exemplary embodiment, if the information on the color temperature of the light source is supplied to the white extraction unit 50, the white extraction unit 50 uses a white extraction range adapted to the color temperature, as a white extraction area set in a certain range centered on white of an achromatic color area. Then, the white extraction unit 50 determines a white extraction range obtained by changing and adjusting the white extraction range adapted to the color temperature of the light source based on the OB area color difference information. If the pieces of information on both the illuminance and the color temperature are supplied to the white extraction unit 50, the white extraction unit 50 may determine a white extraction area based on the pieces of information on both the illuminance and the color temperature.

If the information on the color temperature of the light source is supplied to the WB control unit 60, the WB control unit 60 uses a WB control range adapted to the color temperature, as a fixed WB control range set in advance. The WB control unit 60 according to the present exemplary embodiment determines a WB control range obtained by adjusting the WB control range adapted to the color temperature of the light source to change based on the OB area color difference information. If the pieces of information on both the illuminance and the color temperature are supplied to the WB control unit 60, the WB control unit 60 may determine a white extraction area based on the pieces of information on both the illuminance and the color temperature.

Only either one or both of the determination of the white extraction area and the determination of the WB control range based on the information on the illuminance may be performed. Only either one or both of the determination of the white extraction area and the determination of the WB control range based on the information on the color temperature may be performed. Only either one of the determination of the white extraction area and the WB control range based on the information on the illuminance and the determination of the white extraction area and the WB control range based on the information on the color temperature may be performed.

As described above, in the third exemplary embodiment, the image processing unit 100 determines a white extraction range and a WB control range with illuminance and the color temperature of a light source also taken into consideration. According to the third exemplary embodiment, it is possible to perform appropriate WB control with illuminance and the color temperature of a light source also taken into consideration.

With reference to FIGS. 1C, 8, 9, 10A, and 10B, an image processing apparatus according to a fourth exemplary embodiment of the present disclosure is described below. In the fourth exemplary embodiment, among components in FIG. 1C, components similar to those in FIG. 1A or 1B are designated by the same reference signs, and the redundant description thereof is omitted.

In addition to the components in the above exemplary embodiments, the image processing unit 100 according to the fourth exemplary embodiment further includes a condition acquisition unit 90. The configuration in FIG. 1C also includes an illuminance acquisition unit 70 and a color temperature acquisition unit 80 similar to those in FIG. 1B. The image processing unit 100 according to the fourth exemplary embodiment, however, may not include these components. The condition acquisition unit 90 acquires, as imaging conditions of the imaging apparatus, a gain value for amplifying output signals of the image sensor 10, a shutter speed in image capturing, and the temperature of the surface of the image sensor 10 or the temperature near the image sensor 10.

The image processing unit 100 according to the fourth exemplary embodiment estimates the signal amount of color noise with the imaging conditions acquired by the condition acquisition unit 90 also taken into consideration, in addition to the information on the color difference, the luminance, the illuminance, and the color temperature described in the above exemplary embodiments and determines a white extraction range and a WB control range. WB gain processing is similar to that in the first exemplary embodiment, and therefore is not described.

Figure 8:
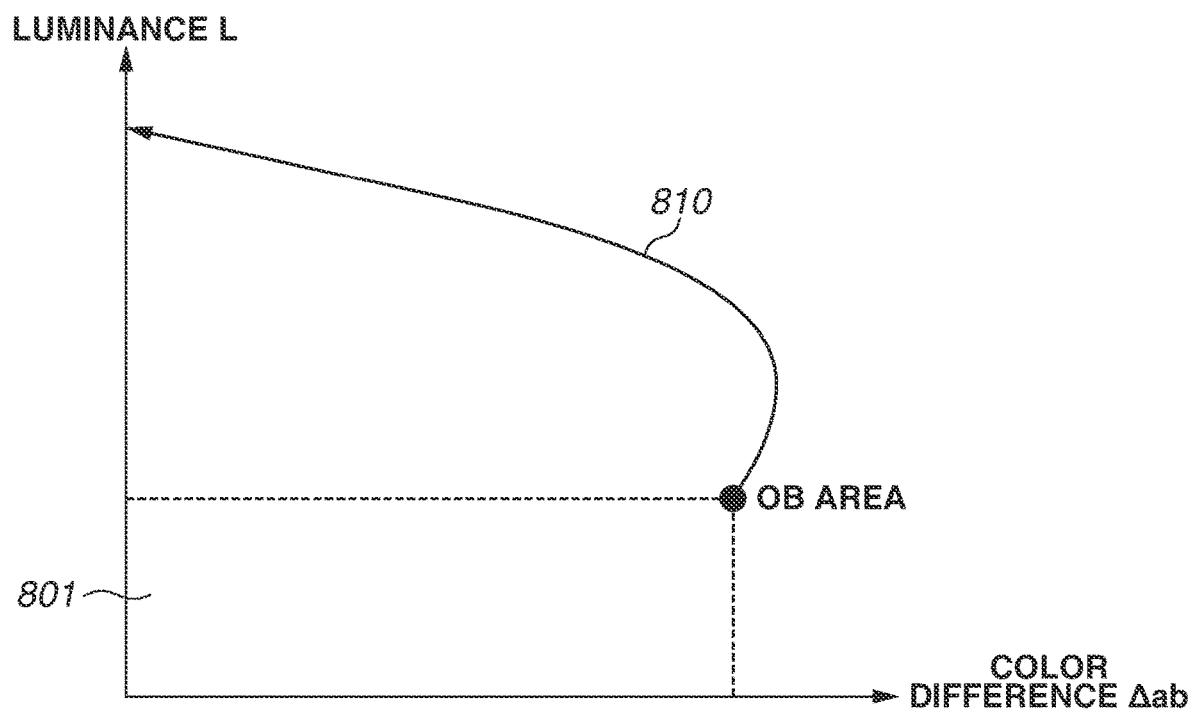
FIG. 8 is a diagram illustrating an example of a relationship between luminance and color noise.

FIG. 8 is a diagram illustrating an example of the relationship between the levels of luminance and color noise in a certain imaging condition based on any one or the combination of two or more of the imaging conditions including the gain value, the shutter speed, and the temperature. In FIG. 8, a rectangular portion 801 indicated by a dotted line represents the levels of luminance L and a color difference Δab in the color noise of the image sensor 10. Similarly to the first exemplary embodiment, the color noise can be estimated from color difference information on the OB area 11. The tendency of the color noise included in a captured image obtained from the effective area 12 of the image sensor 10 differs according to the imaging condition. In the second exemplary embodiment, as can be seen from the relationship between the luminance L and the color noise illustrated in FIG. 6, if the luminance L increases, the color noise decreases. Thus, control according to the luminance L of the effective area 12 is performed. The relationship between the levels of the luminance L and the color noise, however, may not be a relationship as represented by the straight line 610 in FIG. 6, depending on the imaging condition. That is, the relationship between the levels of the luminance L and the color noise may be a relationship as represented by a curve 810 in FIG. 8, depending on the imaging condition.

Figure 9:
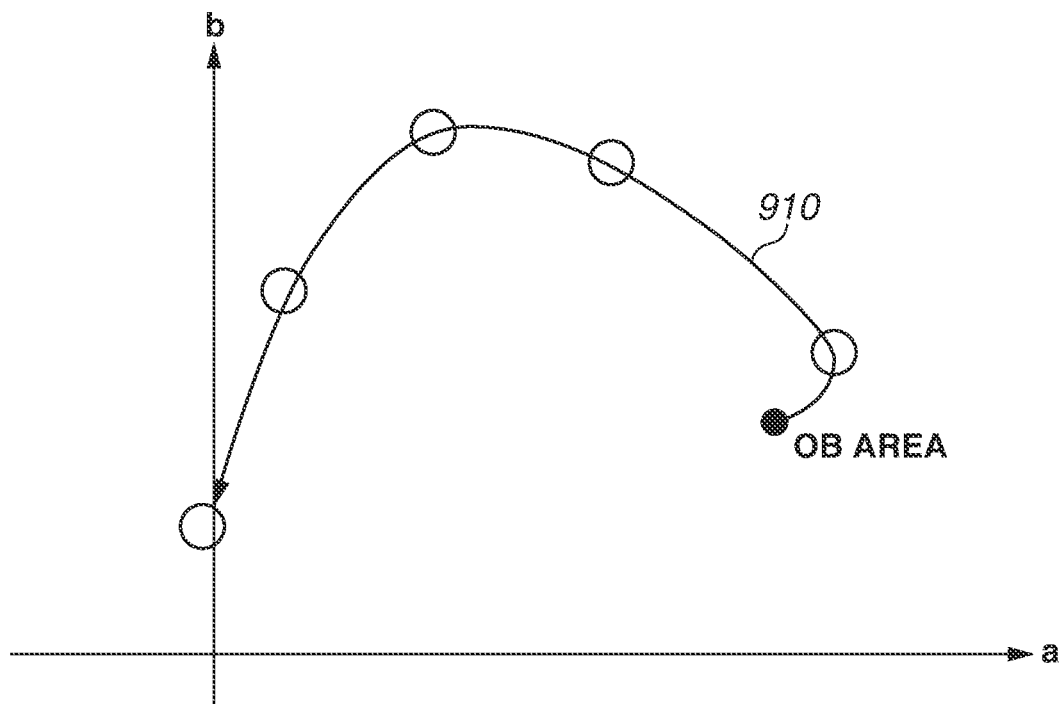
FIG. 9 is a diagram illustrating an example of a correlation between luminance and color noise in an imaging condition.

FIG. 9 is a diagram illustrating the correlation between the luminance L and the color difference Δab in the color noise in a certain imaging condition. A curve 910 in FIG. 9 represents the tendency of the color difference in the color noise with respect to each level of luminance indicated by a white circle in FIG. 9 in a certain imaging condition. In the fourth exemplary embodiment, with respect to each of the imaging conditions that can be acquired by the condition acquisition unit 90, the white extraction unit 50 and the WB control unit 60 hold in advance a correlation table that stores information on the correlation between the luminance L and the color difference Δab in the color noise as represented by the curve 910 in FIG. 9.

In the fourth exemplary embodiment, the white extraction unit 50 references the information in the correlation table and estimates how much color noise is included in a captured image of the effective area 12 in an acquired imaging condition. Then, similarly to the above exemplary embodiments, the white extraction unit 50 changes a white extraction range according to the estimated color noise. Similarly, the WB control unit 60 references the information in the correlation table and estimates how much color noise is included in the captured image of the effective area 12 in the acquired imaging condition. Then, similarly to the above exemplary embodiments, the WB control unit 60 changes a WB control range according to the estimated color noise.

Figure 10A:
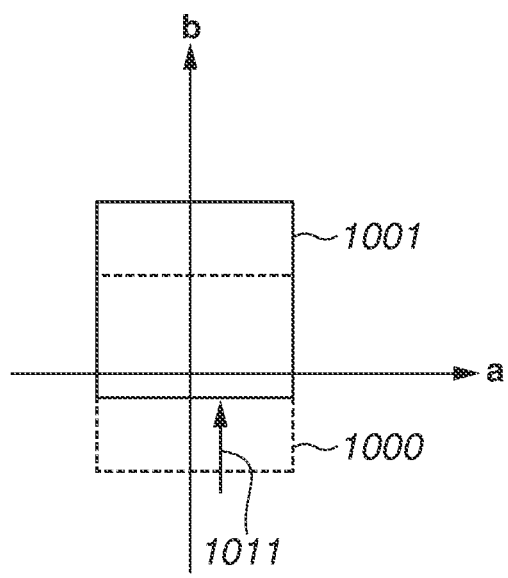
FIGS. 10A and 10B are diagrams each illustrating an example of a change in a white extraction area in conjunction with an imaging condition.
Figure 10B:
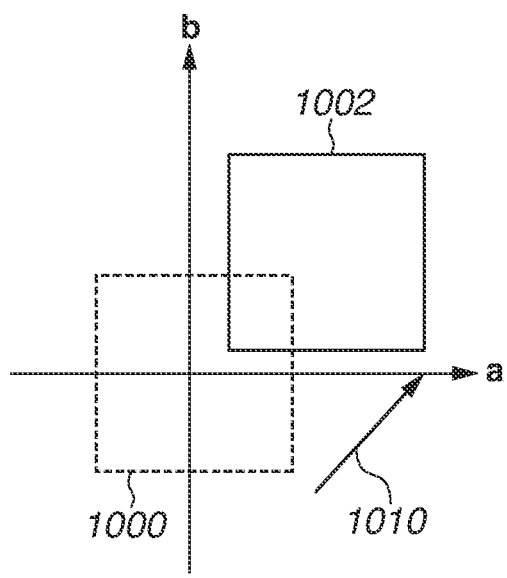

FIGS. 10A and 10B are diagrams each illustrating an example where a white extraction area is changed in conjunction with an acquired imaging condition. A white extraction area 1000 indicated by a dotted rectangle in each of FIGS. 10A and 10B represents an set in a certain range centered on white of an achromatic color area. FIG. 10B illustrates an example of a change in the white extraction area in a case where the luminance of the captured image of the effective area 12 is low luminance close to that of the OB area 11 in a certain imaging condition. In FIG. 10B, the tendency of the color noise is not different from the tendency of the color difference in the OB area 11. Thus, similarly to the above exemplary embodiments, according to the color noise, the white extraction unit 50 determines a white extraction area 1002 that changes by a relatively great amount from the white extraction area 1000. An arrow 1010 in FIG. 10B indicates the direction of the change in the white extraction area. Meanwhile, FIG. 10A illustrates an example of a change in the white extraction area in a case where the luminance of the captured image of the effective area 12 is higher than that of the OB area 11 in a certain imaging condition. In FIG. 10A, the tendency of the color noise is different from the tendency of the color difference in the OB area 11. Thus, based on the tendency of the color difference in the color noise according to the imaging condition and the luminance as illustrated in FIG. 9 in addition to color difference information on the OB area 11, the white extraction unit 50 determines a white extraction range. An arrow 1011 in FIG. 10A indicates the direction of the change in the white extraction area.

The above description has been given taking, as an example, the process of determining a white extraction area. Similarly to the above, also when a WB control range is determined, the imaging conditions are taken into account. More specifically, when determining a WB control range, the WB control unit 60 determines the WB control range, with the imaging conditions.

Only either one or both of the determination of the white extraction area and the determination of the WB control range may be made with the imaging conditions taken into consideration.

As described above, in the fourth exemplary embodiment, the image processing unit 100 determines a white extraction range and a WB control range, with the imaging conditions taken into consideration, and accordingly appropriate WB control with the imaging conditions also taken into consideration can be performed.

While the exemplary embodiments of the present disclosure have been described in detail above, the present disclosure is not limited to these exemplary embodiments, and various exemplary embodiments are also included in the present disclosure. The functions of the image processing unit according to each of the above exemplary embodiments and the processing in the flowchart may be achieved by only a hardware configuration, or may be configured as a software module by a central processing unit (CPU) executing a program. Alternatively, part of the functions of the image processing unit according to each of the above exemplary embodiments and the processing in the flowchart may be configured by hardware, and the rest may be configured as a software module. A program for configuring this software module may be prepared in advance and stored in an internal memory, and may also be acquired from a recording medium such as an external memory or acquired via a network (not illustrated).

The imaging apparatus according to each of the above exemplary embodiments is applicable to a digital camera, a digital video camera, a monitoring camera, an industrial camera, an in-vehicle camera, a medical camera, and a camera of a smartphone or a tablet terminal.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-083013, filed Apr. 24, 2019, which is hereby incorporated by reference herein in its entirety.

What is claimed is:

1. An image processing apparatus comprising:
   one or more processors; and
   at least one memory storing executable instructions, which when executed by the one or more processors, cause the image processing apparatus to perform operations comprising:
   acquiring color difference information from an output signal of a first area optically shielded from light on an image sensor, and
   determining, based on the color difference information, one of a first range in which an achromatic color area is extracted from an output signal of a second area where image capturing for an optical image is performed on the image sensor, and a second range in which white balance of the output signal of the second area is controlled.

2. The image processing apparatus according to claim 1, the operations further comprising:
   acquiring luminance information from the output signal of the second area; and
   determining one of the first range and the second range, using the acquired luminance information.

3. The image processing apparatus according to claim 2, the operations further comprising:
   determining one of the first range and the second range, based on color noise referenced in a first correlation table,
   wherein the first correlation table indicates a correlation between color noise that occurs in each level of luminance of the second area and the color difference information.

4. The image processing apparatus according to claim 1, the operations further comprising:
   acquiring an imaging condition of the image capturing which has been performed; and
   determining one of the first range and the second range, using the acquired imaging condition.

5. The image processing apparatus according to claim 4, wherein the imaging condition includes at least any of a gain for amplifying an output signal of the image sensor, a shutter speed in the image capturing, and a temperature in the image capturing.

6. The image processing apparatus according to claim 1, the operations further comprising:
   acquiring illuminance in the image capturing; and
   determining one of the first range and the second range, using the acquired illuminance.

7. The image processing apparatus according to claim 1, the operations further comprising:
   acquiring a color temperature in the image capturing; and
   determining one of the first range and the second range, using the acquired color temperature.

8. The image processing apparatus according to claim 1, further comprising the image sensor.

9. A control method for controlling an image processing apparatus, the control method comprising:
   acquiring color difference information from an output signal of a first area optically shielded from light on an image sensor, and
   determining, based on the color difference information, one of a first range in which an achromatic color area is extracted from an output signal of a second area where image capturing for an optical image is performed on the image sensor, and a second range in which white balance of the output signal of the second area is controlled.

10. A non-transitory computer-readable storage medium storing a program for causing a computer to execute:
    acquiring color difference information from an output signal of a first area optically shielded from light on an image sensor, and
    determining, based on the color difference information, one of a first range in which an achromatic color area is extracted from an output signal of a second area where image capturing for an optical image is performed on the image sensor, and a second range in which white balance of the output signal of the second area is controlled.

* * * * *